United States Patent
Iijima et al.

(10) Patent No.: US 7,643,392 B2
(45) Date of Patent: Jan. 5, 2010

(54) OPTICAL DISK DEVICE AND TILT CORRECTION METHOD THEREOF

(75) Inventors: Koji Iijima, Yokohama (JP); Motoyuki Suzuki, Yokohama (JP); Junji Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 11/974,336

(22) Filed: Oct. 12, 2007

(65) Prior Publication Data

US 2008/0049577 A1    Feb. 28, 2008

Related U.S. Application Data

(63) Continuation of application No. 10/920,968, filed on Aug. 18, 2004, now Pat. No. 7,295,497.

(30) Foreign Application Priority Data

Feb. 17, 2004    (JP)    ............... 2004-040507

(51) Int. Cl.
*G11B 7/00*    (2006.01)
(52) U.S. Cl. .................... 369/53.19; 369/44.32
(58) Field of Classification Search .............. 369/53.19, 369/44.32, 53.12, 53.14, 53.15, 53.17, 53.13
See application file for complete search history.

(56) References Cited

U.S. PATENT DOCUMENTS 7,054,978 B1    5/2006    Thorsbakken et al.

FOREIGN PATENT DOCUMENTS

| JP | 2003-30842 | 1/2003 |
|---|---|---|
| JP | 2003-281761 | 10/2003 |
| WO | WO 00/79525 | 12/2000 |

*Primary Examiner*—Nabil Z Hindi
(74) *Attorney, Agent, or Firm*—Townsend and Townsend and Crew LLP

(57) ABSTRACT

There are provided an optical disk device and tilt correction processing method for performing recording/reproduction by rapidly acquiring an optimal tilt correction value for an optical disk having a plurality of recording/reproducing layers. In an optical disk device capable of recording or reproducing information by irradiating a laser beam to each of a plurality of recording/reproducing layers of an optical disk, the tilt value is stepwise set within a predetermined range at a predetermined radius position of the recording/reproducing layer located at the farthest distance from the laser beam irradiation side so that an optimal tilt correction value can be obtained from the quadratic function by the method of least squares of the jitter or the like obtained from the disk. By applying the optimal tilt value obtained to the other recording/reproducing layer, it is possible to start recording or reproduction in a short time.

6 Claims, 14 Drawing Sheets

RESULT OF ADJUSTMENT EXECUTED IN N LAYER IN A DISK HAVING A SMALL TILT VALUE

RESULT OF ADJUSTMENT EXECUTED IN N LAYER IN A DISK HAVING A LARGE TILT VALUE (UP-SEARCH METHOD)

RESULT OF ADJUSTMENT EXECUTED IN A DISK HAVING A SMALL TILT VALUE

RESULT OF ADJUSTMENT EXECUTED IN A DISK HAVING A LARGE TILT VALUE

RESULT OF TILT ADJUSTMENT EXECUTED WITH JITTER
RELATED TO TILT OR ERROR RATE RELATED TO TILT
=> MINIMAL POINT IS OPTIMAL TILT VALUE

RESULT OF TILT ADJUSTMENT EXECUTED WITH RF SIGNAL AMPLITUDE
RELATED TO TILT OR Wobble SIGNAL AMPLITUDE RELATED TO TILT OR
TRACKING ERROR SIGNAL AMPLITUDE RELATED TO TILT
=> MAXIMAL POINT IS THE OPTIMAL TILT VALUE

OPTICAL DISK DEVICE AND TILT CORRECTION METHOD THEREOF

INCORPORATION BY REFERENCE

The present application claims priority from Japanese application JP2004-040507 filed on Feb. 17, 2004, the content of which is hereby incorporated by reference into this application.

BACKGROUND OF THE INVENTION

1. Field of the Invention

The present invention relates to an optical disk device for recording or reproducing information onto/from an optical information recording medium such as an optical disk and in particular, to an optical disk device for recording/reproducing information onto/from an optical disk having a plurality of layers recordable or reproducible layers (hereinafter, simply referred to as recording/reproducing layer) and its tilt adjustment method.

2. Description of the Related Art

Generally, in an optical disk device for recording or reproducing information onto/from the recording/reproducing layer formed on the optical disk as an optical information recording medium, as shown in FIG. 12, a disk warp and clamping error cause inclination (so-called tilt value) of a disk with respect to the optical axis of the laser beam, which in turn generates coma aberration on the optical spot focused. This deteriorates the information recording or reproducing operation performance. For this, in order to reduce the deterioration of the recordability or readability caused by disk inclination (tilt value) with respect to the optical axis of the laser beam, it is necessary to perform tilt adjustment and tilt control by detecting and correcting the tilt amount.

On the other hand, recently, for example, a DVD which is one type of such an optical information recording medium, especially DVD-Video (DVD-ROM for recording and reproducing a movie is widely spread. Such a medium often has a two-layered recording/reproducing layer on one side (that is, has a plurality of recording/reproducing layers) as recording capacity of the video data increases. Inn this case also, in the same way as the aforementioned, it is necessary to provide means for correcting/controlling the tilt value optimally.

Conventionally, in an optical disk device for recording or reproducing information onto/from an optical disk having a plurality of recording/reproducing layers, there have been already suggested some techniques related to such a tilt adjustment and tilt control. For example, WO 00/079525 diskloses a method for adjusting the tilt control means in a fine adjustment. That is, when recording or reproducing information onto/from an optical disk having a plurality of data layers, tilt control means is controlled on each of the plurality of data layers of the optical disk so as to set the tilt position (that is, an angle defined by the data layers of the optical disk and the optical axis of the laser beam) and furthermore, at the set tilt position, the tilt control means is adjusted according to the jitter detected.

Moreover, for example, JP-A-2003-30842 diskloses a method for setting a recording condition (recording waveform parameter) appropriate for an optical disk having a plurality of recording layers, wherein data trial write is performed on the recording layers starting at the farthest recording layer from the optical beam incident surface and the data written by trial is read so as to set the recording waveform parameter including the tilt position (value).

SUMMARY OF THE INVENTION

That is, by carrying out the aforementioned conventional technique, it is possible to reduce the deterioration of the recordability or readability caused by the tilt value. However, as has been described above, when the method of fine adjustment of the tilt control means is applied to each layer so that the tilt value is corrected according to the detected jitter or the like, a significant time is required for this and a long time is required before the optical disk device starts recording or reproduction. (First problem)

Moreover, when obtaining the minimum point of the tilt value (optimal tilt value) in the conventional technique, generally, for example, the following adjustment method is applied. As shown in FIG. 13A, 13B, the tilt value is stepwise set in a plurality of values (seven points in this example) within a predetermined range. From the jitter detected at these plurality of tilt values, a minimal point is obtained according to the quadratic function obtained by the method of least squares and the value is set as an optimal tilt correction value. In this case, when the disk has a small tilt value, as shown in FIG. 13A, it is possible to calculate the optimal tilt correction value (minimal point) from the tilt value detected at the seven points within the setting range. However, on the other hand, when the disk has a large tilt value, as shown in FIG. 13B, it is impossible to obtain a minimal point from the jitter obtained at the seven points within the aforementioned setting range and there is a problem that it is impossible to calculate the optimal tilt correction value. (Second problem)

It is therefore an object of the present invention to provide a tilt adjustment method capable of surely detect a tilt value and execute adjustment in a short time and an optical disk device employing it and capable of starting recording or reproduction in a short time.

Firstly, in the optical disk having a plurality of recording/reproducing layers, as is clear from FIG. 12, a tilt value detected for one layer is almost identical for the other layer if the disk radius positions are almost identical. Accordingly, the optimal tilt correction value calculated according to the detected tilt value can also be applied to the other layer. This is the main point recognized by the inventors of the present invention.

That is, in the optical disk having a plurality of recording/reproducing layers, if the disk radius positions are identical, the tilt value as the disk inclination with respect to the optical axis of the laser beam is almost identical in a plurality of different layers. For this, by applying the optimal tilt correction value calculated by executing tilt adjustment in one layer, to the correction value for the other layer also, it is possible to realize detection of the tilt value and its correction value adjustment in a short time as compared to the conventional case in which the tilt value detection and its correction value adjustment are executed for each of the layers. Thus, it is possible to reduce the time until the optical disk device starts recording or reproduction, thereby solving the aforementioned first problem.

Furthermore, in this invention, it is known that the coma aberration generated by increase of the tilt value increases in proportion to the thickness of the disk substrate. For this, the angle error allowed for inclination of the disk and the laser beam optical axis (tilt margin) is narrowed in inverse proportion to the thickness of the disk substrate. Especially in the optical disk having a plurality of recording/reproducing layer, the N layer located at the farthest distance from the objective lens among the plurality of layers has the least tilt margin.

In this invention, the aforementioned phenomenon is utilized. That is, the aforementioned jitter adjustment is executed in the recording/reproducing layer which is located at the farthest distance from the objective lens among the plurality of recording/reproducing layers. For example, as shown in FIG. 2A, the optical disk tilt value is stepwise set at seven points within a predetermined range and its minimal point is calculated according to the quadratic function obtained by the method of least squares of the detected jitter, and the value of the minimal point is set as the optimal tilt correction value. In this case, the inclination of the normal passing through an arbitrary tilt value excluding the normal passing through the tilt value=0 of the quadratic function by the method of the least squares in each layer becomes greatest at the N layer (indicated by the solid line in the figure) located at the farthest distance from the objective lens among the plurality of layers. (For reference, in this figure, the jitter and the inclination of the normal obtained in the recording/reproducing layer N-1 below the N layer is indicated by the broken line).

As shown in FIG. 2B, even in a disk having a large tilt value, like the aforementioned, the inclination of the normal at the jitter detected at the N layer which is located at the farthest distance from the objective lens among the plurality of layers is greatest. For this, even when applying the adjustment method for stepwise setting the tilt value within a predetermined range and setting the optimal tilt correction value according to the quadratic function by the method of the least squares with the jitter detected, the tilt adjustment can be executed by using the jitter detected in the N layer which is the recording/reproducing layer at the farthest distance from the objective lens, so that the minimal point can easily be obtained and the tilt adjustment can surely be executed. That is, the aforementioned second problem is solved.

Thus, the present invention is realized by the recognition of the inventors. More specifically, in order to achieve the object of the present invention, firstly, there is provided a tilt correction processing method for correcting a tilt value as an inclination of an optical disk with respect to an optical axis of a laser beam which is irradiated to each layer of a plurality of recording/reproducing layers of the optical disk in an optical disk device for recording or reproducing information, wherein among the plurality of layers, at a predetermined radius position of the recording/reproducing layer arranged at the farthest distance from the laser beam irradiation side, the tilt value is stepwise set within a predetermined range so that an optimal tilt correction value is obtained according to a calculation value of a predetermined signal obtained from the optical disk and the optimal tilt correction value obtained is also applied to the recording/reproducing layer other than the recording/reproducing layer at the farthest distance from the laser irradiation side.

It should be noted that in the aforementioned tilt correction processing method, the calculation value of the predetermined signal obtained from the optical disk by stepwise setting the tilt value in the predetermined range is a jitter, an error rate, a reproduction signal amplitude, a wobble signal amplitude, or a tracking error signal amplitude. As shown in FIG. 14, the jitter, the error rate, the reproduction signal amplitude, a wobble signal amplitude, or a tracking error signal amplitude obtained from the optical disk by stepwise setting the tilt value in the predetermined range is subjected to the method of least squares to obtain a quadratic function, from a minimum value or a maximum value of which, the optimal tilt correction value is obtained.

According to another aspect of the present invention, there is provided an optical disk device capable of irradiating a laser beam to each layer of an optical disk having a plurality of recording/reproducing layers for recording or reproducing information, the optical disk device comprising: a disk motor for rotating the optical disk; laser emission control means for irradiating a laser beam for recording or reproducing information onto/from the optical disk; an objective lens for focusing the laser beam onto the information recording surface of the optical disk; a photo-detector for generating a light reception signal according to the reflected light of the laser beam focused by the objective lens, from the optical disk; disk signal detection means for detecting and calculating a predetermined signal of the optical disk according to the light reception signal in the photo-detector; a tilt actuator for tilting the objective lens; tilt control means for controlling the tilt actuator; and a tilt calculator for setting a tilt value which is a relative inclination between the optical disk and the laser beam in the tilt control means; wherein the tilt calculator performs a tilt adjustment for calculating an optimal tilt correction value by the method of least squares of the tilt amount stepwise set in the tilt control means and the calculation amount according to a predetermined signal in the disk signal detection means, and the tilt adjustment is executed in the recording/reproducing layer located at the farthest distance from the objective lens among the plurality of layers and the optimal tilt correction value calculated is also applied to the other recording/reproducing layer. That is, according to the present invention, in an optical disk device for recording or reproducing information onto/from an optical disk having a plurality of recording/reproducing layers, the optimal tilt correction value can also calculated even when applying the adjustment method based on the stepwise tilt value setting within a predetermined range. Moreover, simultaneously with this, an optimal tilt correction value calculated in one of the layers can be applied to the other layer. By providing such a tilt adjustment method capable of applying an optimal tilt correction value calculated in one layer to the other layer, it is possible to reduce the time until recording or reproduction is started and improve the recordability or readability for the tilt value.

According to still another aspect of the present invention, the optical disk device may further comprise:
a focus actuator driving the objective lens in the vertical direction of the optical disk; focus error signal detection means for generating a focus error signal which is a difference between the objective lens focusing point and a predetermined position according to the light reception signal in the photo-detector; and focus control means for controlling the focus actuator by generating a focus servo signal for the objective lens into the optical disk according to the output from the focus error signal detection means; wherein the focus control means executes the down-search method for performing focus pull in processing at a predetermined timing while driving the focus actuator in the direction that the objective lens moves apart from the optical disk and the tilt adjustment is executed in the recording/reproducing layer where the focus pull in processing has been executed firstly.

According to yet another aspect of the present invention, the optical disk device may further comprise: a focus actuator for driving the objective lens in the vertical direction of the optical disk; focus error signal detection means for generating a focus error signal as a difference between the objective lens focusing point and a predetermined position according to the light reception signal in the photo-detector; focus control means for controlling the focus actuator by generating a focus servo signal for the objective lens into the optical disk according to the output from the focus error signal detection means; and counter means for counting the number of the recording/reproducing layers according to the focus error signal;

wherein the focus control means executes the up-search method for performing focus pull in processing at a predetermined timing while driving the focus actuator in the direction that the objective lens approaches the optical disk and if the count value of the counter means has reached a predetermined value while executing the up-search method, the tilt adjustment is executed after the focus pull in processing is completed.

That is, according to the aforementioned configuration, in the down-search method executing the focus pull in processing at a predetermined timing while driving the focus actuator in the direction that the objective lens moves apart from the optical disk, the tilt adjustment is executed in the recording/reproducing layer in which the focus pull in processing is executed firstly. Moreover, in the up-search method executing the focus pull in processing while driving the focus actuator in the direction that the objective lens approaches the optical disk, counter means is provided for counting the number of recording/reproducing layers according to the focus error signal and if the count value of the counter means reaches a predetermined value during execution of the up-search, the focus pull in processing is followed by the tilt adjustment. When using either of the down-search method or the up-search method, it is possible to surely calculate the optimal tilt correction value in the recording/reproducing layer located at the farthest distance from the object lens among the plurality of recording/reproducing layers and the value can be applied to the other recording/reproducing layer.

According to yet still another aspect of the present invention, the optical disk device may further comprise: a tracking actuator for driving the objective lens in the radius direction of the optical disk; tracking error signal detection means for generating a tracking error signal which is a difference between the objective lens tracking following position and a predetermined track according to the light reception signal from the photo-detector; and tracking control means for controlling the tracking actuator by generating a tracking servo signal for the objective lens to follow the track on the disk; wherein the tracking control means applies the position of radius direction of the optical disk when the tilt adjustment is executed, together with the calculated optimal tilt correction value. Thus, the optimal tilt correction value calculated in the recording/reproducing layer located at the farthest distance from the objective lens can be surely applied to the identical disk radius position in an optical disk having a plurality of recording/reproducing layers.

According to still another aspect of the present invention, the optical disk device may further comprise: a memory for storing the optimal tilt correction value calculated in the tilt adjustment, wherein the tilt calculator sets the optimal tilt correction value stored in the memory for the tilt control means. Alternatively, the memory may further record the disk position in the radius direction when the tilt adjustment is executed. The optical disk device may device further comprise: disk information acquisition means for acquiring disk address information recorded in advance in the optical disk according to the light reception signal in the photo-detector; a first memory for storing the optimal tilt correction value calculated in the tilt adjustment; and a second memory for storing the disk address information on the optical disk when the tilt adjustment is executed; wherein the tilt calculator sets the optimal tilt correction value stored in the first memory for the tilt control means according to the disk address information stored in the second memory.

According to yet another aspect of the present invention, in the optical disk device, the disk information acquisition means may further acquire disk layer information recorded on the optical disk according to the light reception signal in the photo-detector and include a third memory for storing the disk layer information on the optical disk when the tilt adjustment is executed; and the tilt calculator may set the optimal tilt correction value stored in the first memory for the tilt control means according to the disk address information stored in the second memory or the disk layer information stored in the third memory. Alternatively, the memory may be arranged inside the tilt calculator; the second memory may be arranged in side the tilt calculator; or the third memory may be arranged in side the tilt calculator.

That is, the optical disk device may comprise disk information acquisition means for acquiring disk address information or disk layer information recorded in advance in the optical disk according to the light reception signal in the photo-detector; a first memory for storing the optimal tilt correction value calculated in the tilt adjustment; a second memory for storing the disk address information on the optical disk when the tilt adjustment is executed; and a third memory for storing the disk layer information on the optical disk when the tilt adjustment is executed. It should be noted that the tilt calculator sets the optimal tilt correction value stored in the first memory for the tilt control means according to the disk address information stored in the second memory. Alternatively, the tilt calculator may set the optimal tilt correction value stored in the first memory for the tilt control means according to the disk address information stored in the second memory or the disk layer information stored in the third memory. The first memory, the second memory, and the third memory may be arranged inside the tilt calculator. Furthermore, in the optical disk device, if the time until recording or reproduction is started has a constraint, the predetermined count value of the counter means for executing the tilt adjustment may be set according to the time until recording or reproduction is started.

As has been described above, according to the optical disk device and its tilt correction processing method of the present invention, the tilt adjustment for calculating the optimal tilt correction value can be executed in a short time for the optical disk having a plurality of recording/reproducing layers. Thus, it is possible to provide an optical disk device capable of reducing the time until the optical disk device starts its recording or reproduction and improving the recordability or readability for the disk tilt value.

Other objects, features and advantages of the invention will become apparent from the following description of the embodiments of the invention taken in conjunction with the accompanying drawings.

DESCRIPTION OF THE EMBODIMENTS

Description will now be directed to embodiments of the present invention with reference to the attached drawings.

Embodiment 1

Figure 3:
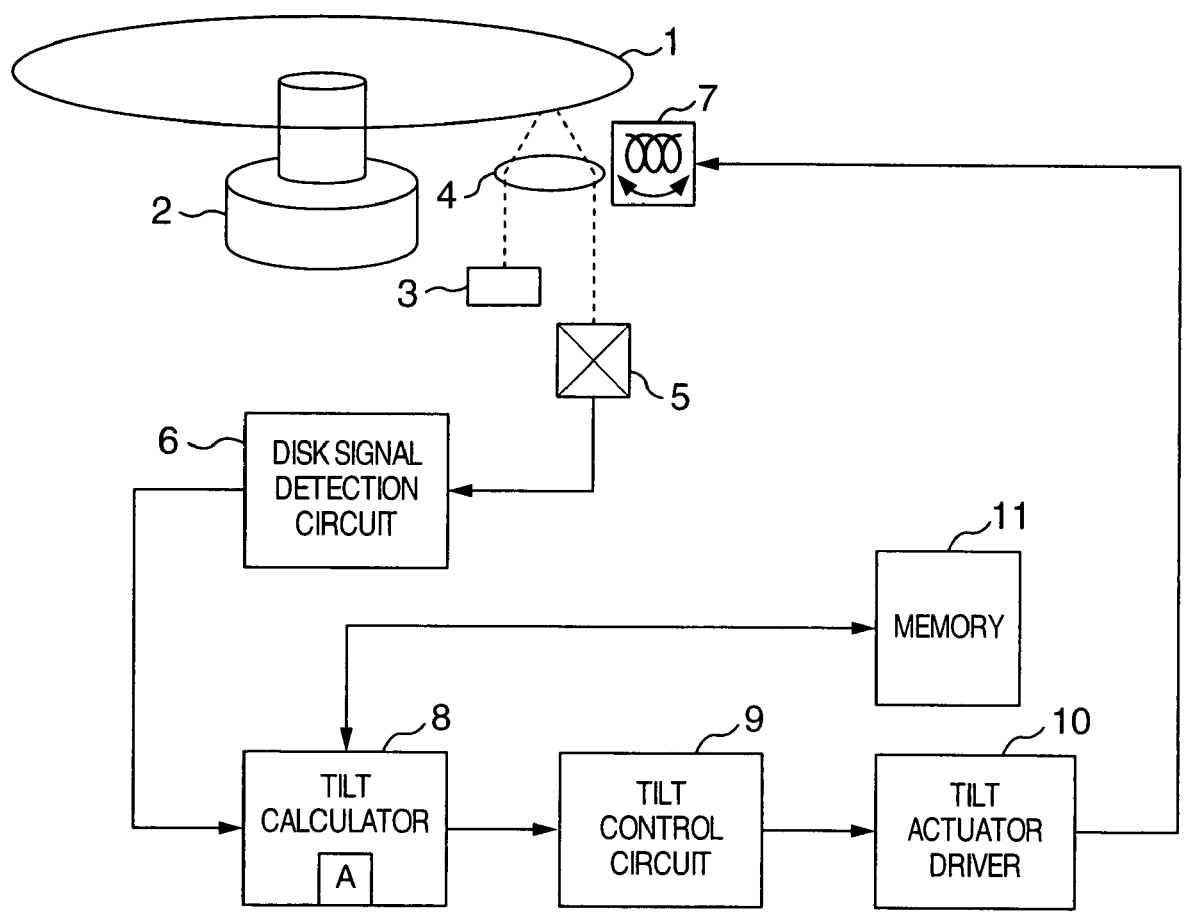
FIG. 3 is a block diagram showing a configuration example of the optical disk device according to a first embodiment of the present invention.

FIG. 3 shows an optical disk device for recording or reproducing information onto/from an optical disk 1 having a plurality of recording/reproducing layers. In FIG. 3, the optical disk 1 having the plurality of recording/reproducing layers is mounted on a rotation shaft of a disk motor 2 so as to be rotated at a predetermined rpm. A laser beam emitting control circuit 3 irradiates a laser beam (broken line in the figure) to the optical disk 1 and an objective lens 4 focuses the irradiated laser beam on the information recording surface of the optical disk 1. Moreover, a photo-detector 5 detects reflected light of the laser beam irradiated from the optical disk 1 and generates a reception signal according to it. According to the reception signal generated in the photo-detector 5, a disk signal detection circuit 6 detects a predetermined signal recorded on the information recording surface of the optical disk 1 and performs calculation.

On the other hand, a tilt actuator 7 tilts the objective lens 4 with respect to the optical axis of the laser beam. Moreover, a tilt actuator driver 10 drives the tilt actuator 7. Furthermore a tilt control circuit transmits a drive signal for driving the tilt actuator 7 to the tilt actuator driver 10. A tilt calculator 8 sets a tilt value which is a relative tilt between the optical disk 1 and the laser beam.

Figure 1:
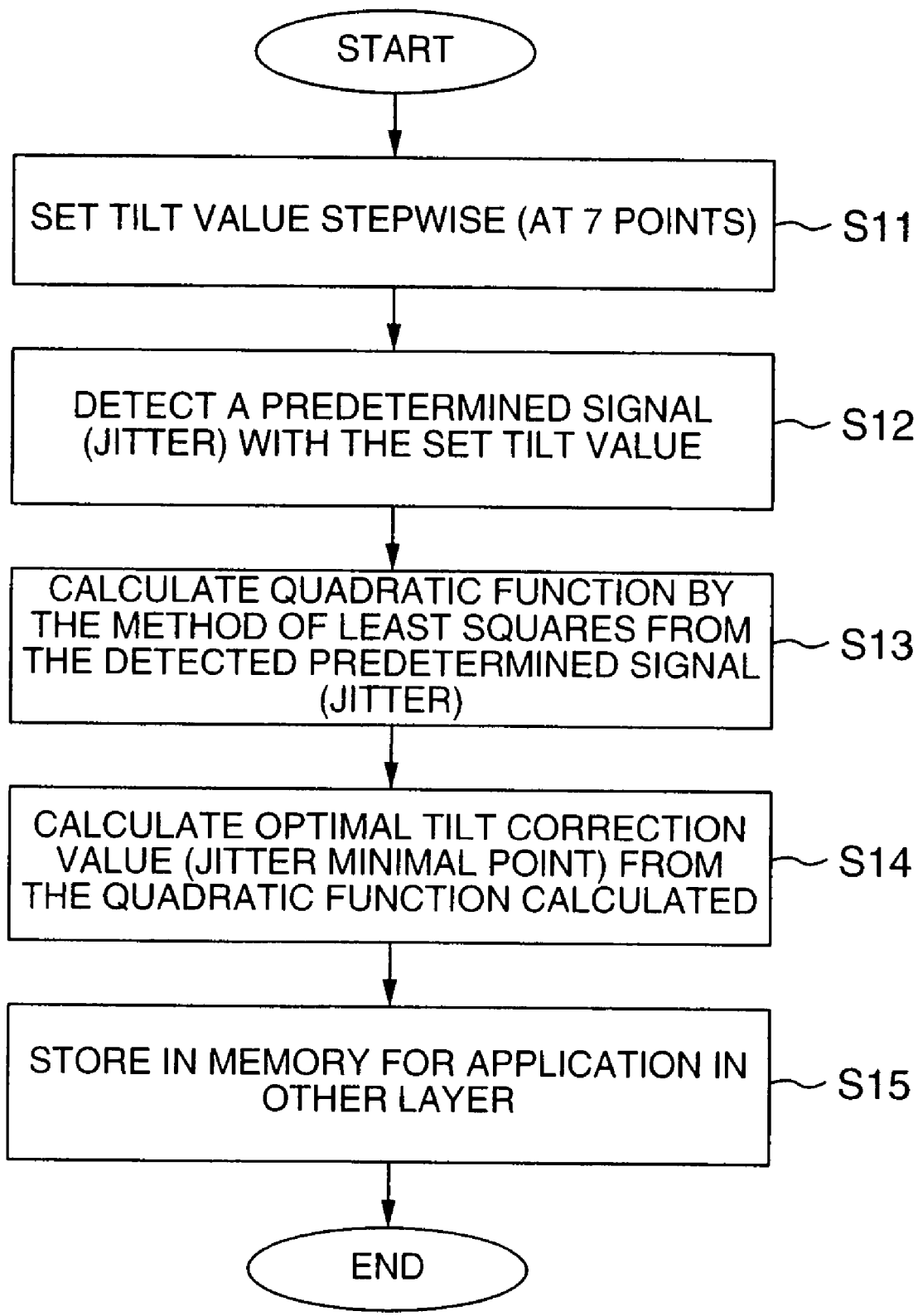
FIG. 1 is a flowchart showing a tilt correction method of an optical disk device according to the present invention.
Figure 2A:
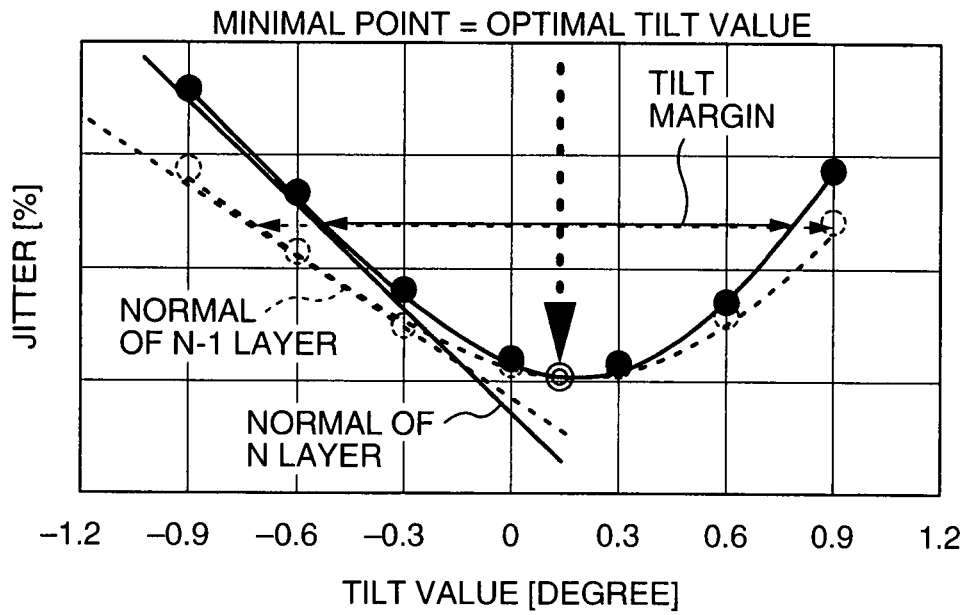
FIG. 2A and FIG. 2B show examples of distribution of jitters detected with respect to the tilt value set stepwise in a predetermined range in the optical disk device according to the present invention.
Figure 2B:
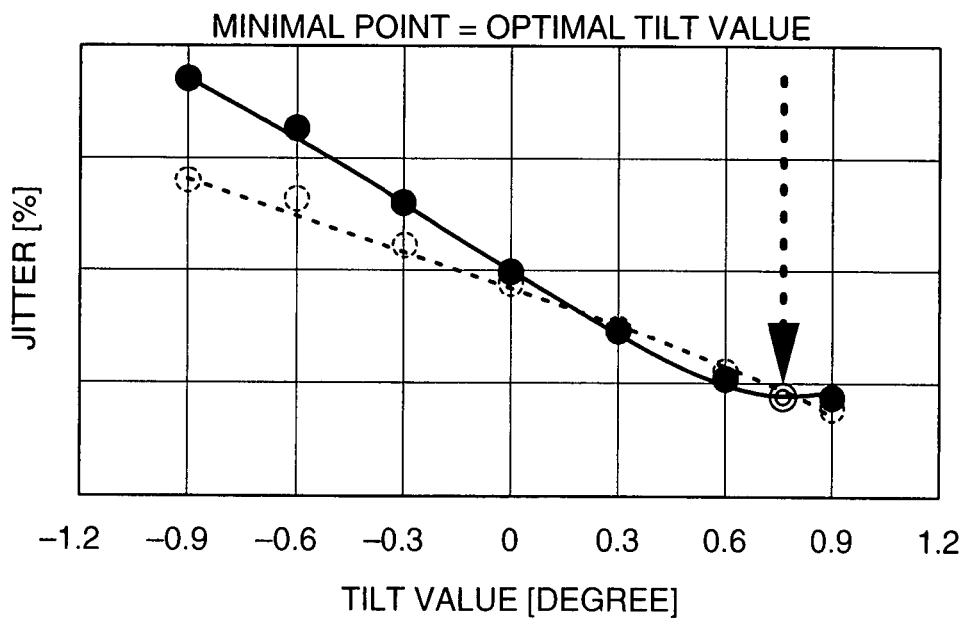

It should be noted that tilt adjustment A in this tilt calculator 8 executes the following processes as shown in FIG. 1. That is, when the process starts, firstly, the tilt calculator 8 stepwise set a tilt value with respect to the tilt control circuit 9 (step S11) and detects a predetermined signal (including a jitter) in the disk signal detection circuit 6 at each tilt value set (step S12). After this, by the calculation based on the value of the predetermined signal (including a jitter) detected in the disk signal detection circuit 6, i.e., the method of least squares of the detected value, a quadratic function is obtained (step 13). According to the quadratic function obtained, an optimal tilt correction value is calculated (that is, the jitter minimum point is obtained in FIG. 2 and this is used as an optimal tilt correction value) (step 14). After this, the tilt calculator 8 stores the optimal tilt correction value calculated in the aforementioned tilt adjustment A in a memory 11 of the device so as to be used in the other recording/reproducing layer (step 15), thereby terminating the processing. Here, information on the radius position of the disk on which the aforementioned tilt adjustment has been executed (such as disk layer information) is also stored in the memory 11.

After this, in the recording or reproduction operation in the optical disk device, the tilt calculator 8 acquires the optimal tilt correction value from the memory 11 and optimally adjusts the tilt value of the objective lens 4 via the tilt control circuit 9, the tilt actuator driver 10, and the tilt actuator 7 according to the optimal tilt correction value, thereby executing a predetermined recording or reproduction operation onto/from any of the recording/reproducing layers of the optical disk.

It should be noted that the predetermined signal in the disk signal detection circuit 6 used for calculating the optimal tilt correction value is, for example, a reproduction signal, a wobble signal, or a tracking error signal. Moreover, the calculation value based on the predetermined signal in the disk signal detection circuit 6 is a jitter, an error rate, a reproduction signal amplitude, a wobble signal amplitude, or a tracking error signal amplitude.

In the optical disk device shown in FIG. 3, the aforementioned tilt adjustment A is executed to the optical disk 1 mounted on the device and having a plurality of recording/reproducing layers, i.e., at the recording/reproducing layer farthest from the objective lens 4 among the plurality of layers. The optimal tilt correction value calculated is stored in the memory 11. The optimal tilt correction value stored in the memory 11 is used for the other layers. As compared to the conventional technique in which tilt adjustment for calculating the optimal tilt correction value is executed for each of the layers of the optical disk having a plurality of recording/reproducing layers, it is possible to obtain the optimal tilt correction value for the other layers by one tilt adjustment. Accordingly, it is possible to reduce the time until the optical disk device starts recording or reproduction. Since the tilt adjustment A is executed at the recording/reproducing layer farthest from the objective lens 4 among the layers of the optical disk 1, it is possible to accurately obtain the optimal tilt value (for example, corresponding to the jitter minimum point) even for an optical disk having a large tilt value and execute the tilt adjustment.

Embodiment 2

Figure 4:
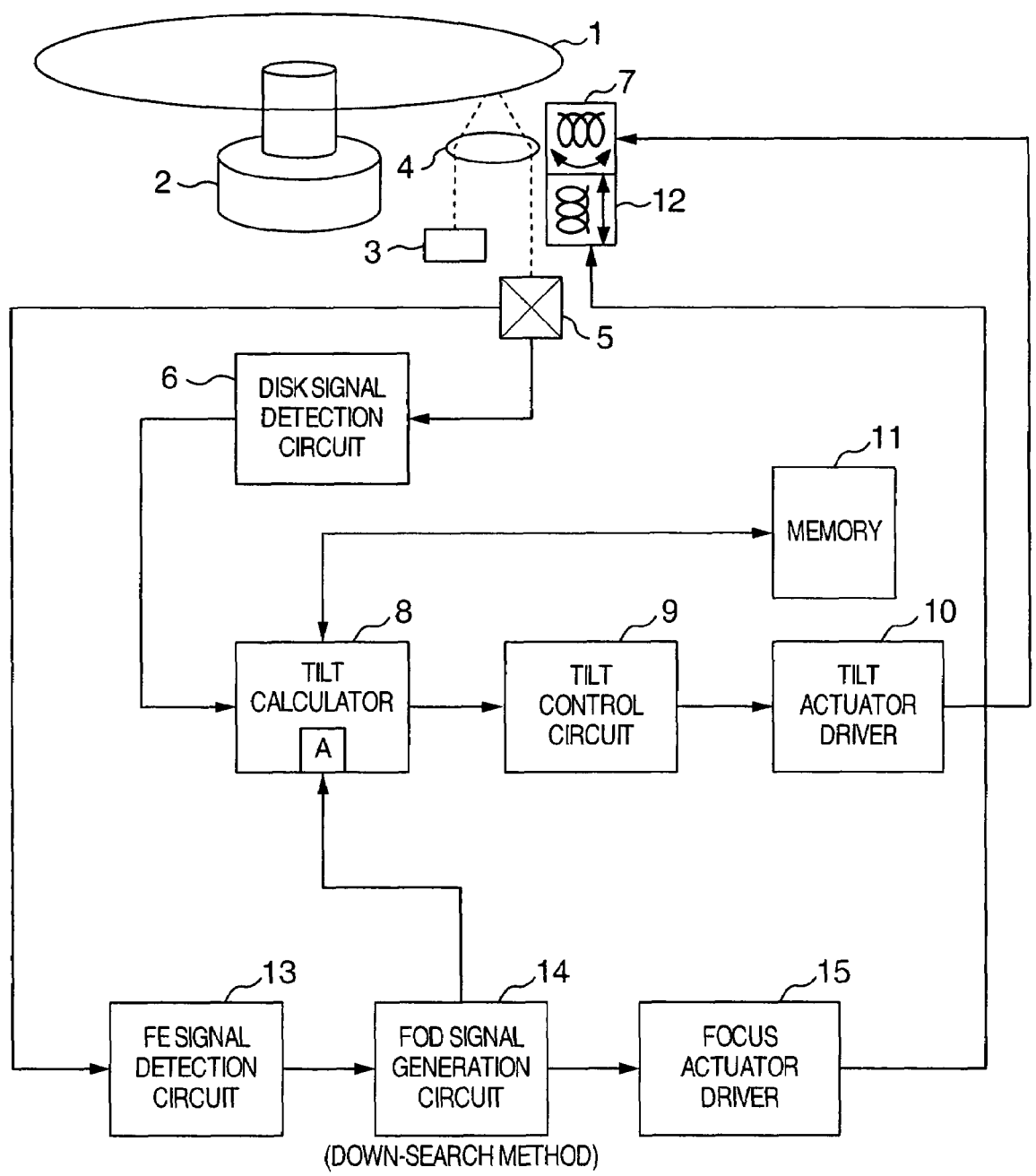
FIG. 4 is a block diagram showing a configuration example of the optical disk device according to a second embodiment of the present invention.

FIG. 4 is a block diagram showing a configuration example of an optical disk device according to a second embodiment of the present invention. Hereinafter, with reference to FIG. 4, explanation will be given on the operation and characteristic of respective blocks of the optical disk device according to the second embodiment in comparison with the first embodiment shown in FIG. 3.

The optical device according to the second embodiment of the present invention having configuration shown in FIG. 4 includes a focus actuator 121, a focus error signal detection circuit)FE signal detection circuit) 13, a focus drive signal generation circuit (FOD signal generation circuit) 14, and a focus actuator driver 15. The optical device according to the second embodiment further includes blocks indicated by the reference symbols 1 to 11 and A which operate in the same way as in FIG. 3 and their explanations are omitted.

In FIG. 4, the focus actuator 12 drives the objective lens 4 in the vertical direction with respect to the information recording surface of the optical disk 1. Moreover, the focus error signal detection circuit 13 generates a so-called focus error signal which is a difference between the focus point of the objective lens 4 and a predetermined position according to a reception signal in the photo-detector 5. Moreover, the focus drive signal generation circuit 14 generates a focus servo signal for focusing objective lens 4 on the optical disk 1 according to the output of the focus error signal detection circuit 13.

The focus actuator driver 15 drives the focus actuator 12 according to a signal transmitted from the focus drive signal generation circuit 14.

That is, the optical disk drive shown in FIG. 4 is characterized by the so-called down-search method for performing the process to start a focus control at a predetermined timing (hereinafter, simply referred to as "focus pull in processing") while driving the focus actuator 12 apart from the optical disk 1. For this, the aforementioned tilt adjustment A is executed to the recording/reproducing layer firstly subjected to focus pull in processing and the optimal tilt correction value stored in the memory 11 is also applied to the other layers.

Embodiment 3

Figure 5:
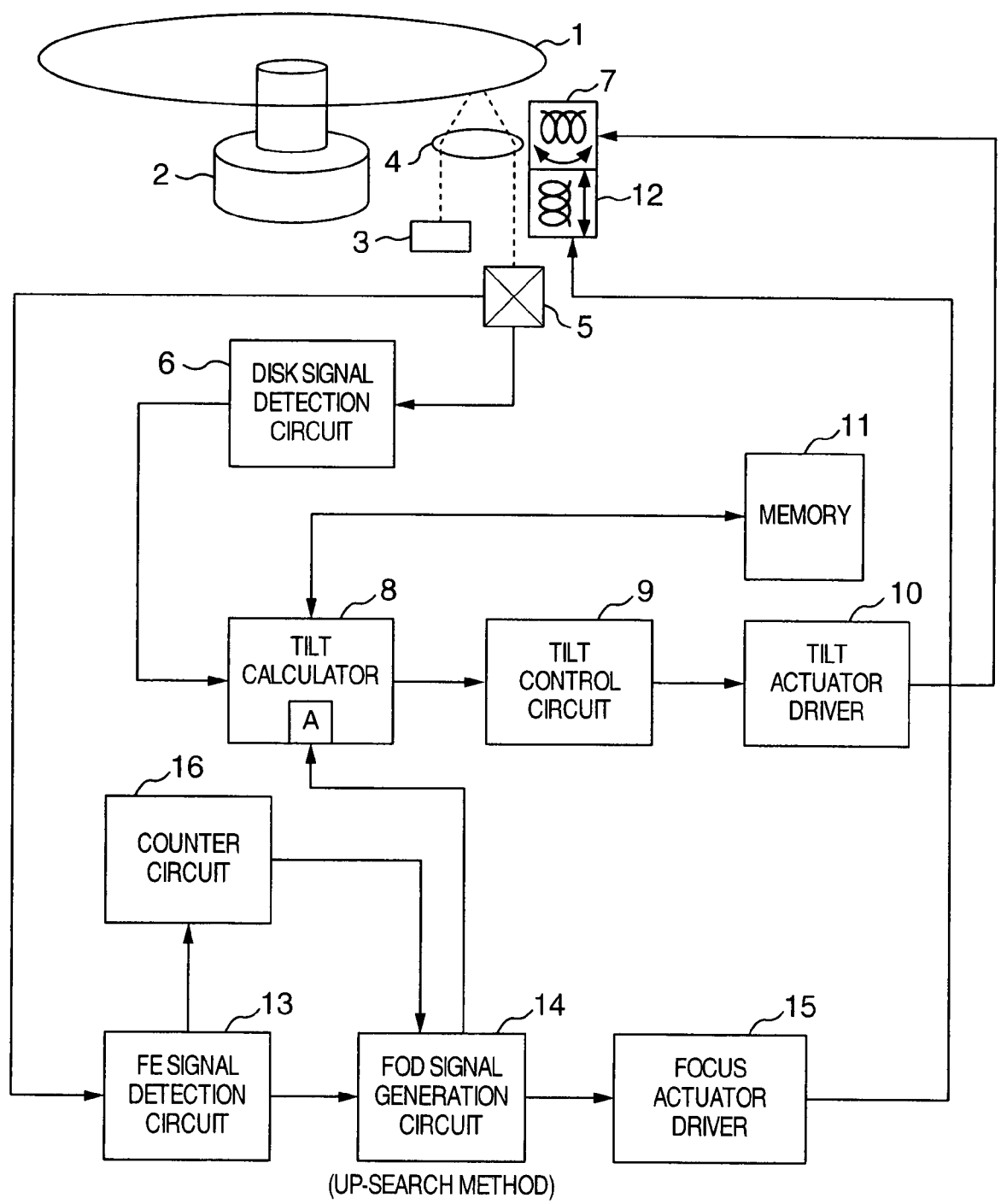
FIG. 5 is a block diagram showing a configuration example of the optical disk device according to a third embodiment of the present invention.

FIG. 5 is a block diagram showing a configuration example of the optical disk device according to a third embodiment of the present invention. Hereinafter, explanation will be given on operation and characteristics of respective blocks with reference to FIG. 5. It should be-noted that in this optical disk device of FIG. 5, except for the focus drive signal generation circuit 14 and the counter circuit 16, the blocks indicated by reference symbols 1-13, 15 and A operate in the same way as in FIG. 3 and FIG. 4 and their explanations are omitted.

In FIG. 5, the counter circuit 16 counts the number of recording/reproducing layers of the optical disk 1 according to the focus error signal output from the focus error signal detection circuit 13. The focus drive signal generation circuit 14 generates a focus servo signal for focusing the objective lens 4 on the optical disk 1 according to the output of the focus error signal detection circuit and the output of the counter circuit.

That is, the optical disk device shown in FIG. 5 is characterized by the so-called up-search method for performing focus pull in process while the driving the focus actuator 12 so that the objective lens 4 approaches the optical disk 1. When the count value of the counter circuit 16 reaches a predetermined value while executing the up-search method, focus pull in process is executed and the aforementioned tilt adjustment A is executed. The optimal tilt correction value stored in the memory 11 is also applied to the other layers.

Embodiment 4

Figure 6:
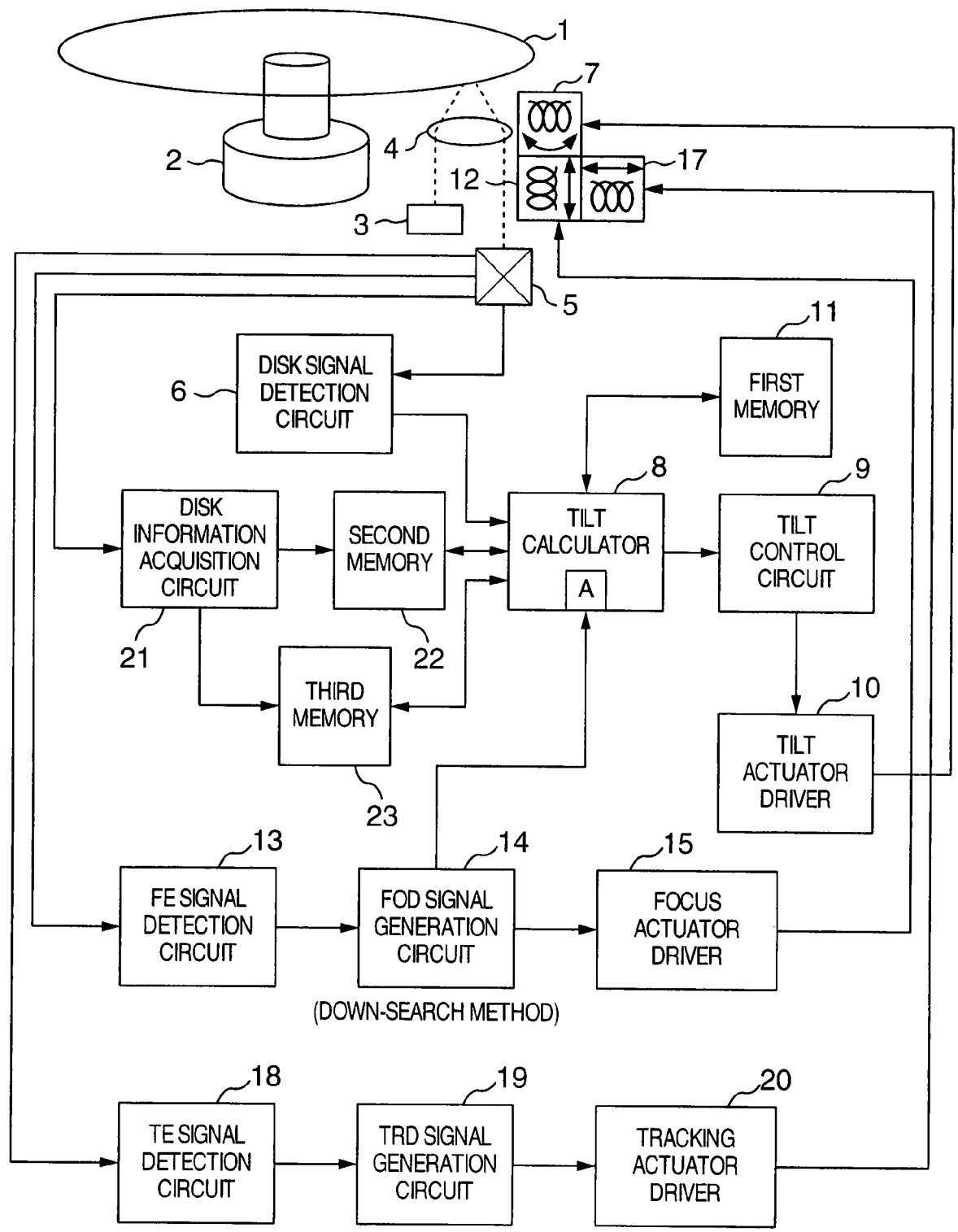
FIG. 6 is a block diagram showing a configuration example of the optical disk device according to a fourth embodiment of the present invention.

FIG. 6 is a block diagram showing a configuration example of the optical disk device according to a fourth embodiment of the present invention. Hereinafter, explanation will be given on the operation and characteristics of respective blocks with reference to FIG. 6.

The optical disk device according to the fourth embodiment of the present invention shown in FIG. 6 includes a tilt calculator 8 a tracking actuator 17, a tracking error signal detection circuit (TE signal detection circuit) 18, a tracking drive signal generation circuit (TRD signal generation circuit) 19, a tracking actuator driver 20, disk information acquisition means, a second memory 22, and a third memory 23. The optical disk device of the fourth embodiment further includes the blocks indicated by reference symbols 1-7, 9-15, and A which operate in the same way as in FIG. 3 and FIG. 4 and their explanations are omitted. It should be noted that the first memory 11 is equivalent to the memory 11 shown in FIG. 3 and FIG. 4.

In FIG. 6, the tilt calculator 8 sets a tilt value as a relative inclination of the optical disk 1 with respect to the laser beam, in the tilt control circuit 9. On the other hand, the tracking error signal detection circuit 18 generates a tracking error signal which is a difference between the track following position of the objective lens 4 and a predetermined track according to the reception signal of the photo-detector 5. The tracking drive signal generation circuit 19 generates a tracking servo signal for the objective lens 4 to follow the track of the optical disk 1. The tracking actuator driver 20 drives the tracking actuator 17 according to a signal transmitted from the tracking drive signal generation circuit 19.

On the other hand, the disk information acquisition circuit 21 acquires disk address information or disk layer information recorded in advance on the optical disk according to the reception signal in the photo-detector 5. The second memory 22 stores the disk address information when the tilt adjustment A is executed. The third memory 23 stores the optical disk layer information when the tilt adjustment A is executed. Furthermore, the tilt calculator 8 acquires the optimal tilt correction value from the first memory 11 according to the disk address information stored in the second memory 22 or the disk layer information stored in the third memory 23.

The optical disk device according to the fourth embodiment of the present invention shown in FIG. 6 is characterized in that as compared to the up-search in the aforementioned embodiment, the down-search method is employed and after performing a process to start the tracking control at a predetermined timing in the recording/reproducing layer where firstly focus pull in has been executed, the aforementioned tilt adjustment A is executed and the optimal tilt correction value stored in the first memory 11 is set in the tilt control circuit 9 according to the disk address information stored in the second memory 22 or the disk layer information stored in the third memory 23.

Embodiment 5

Figure 7:
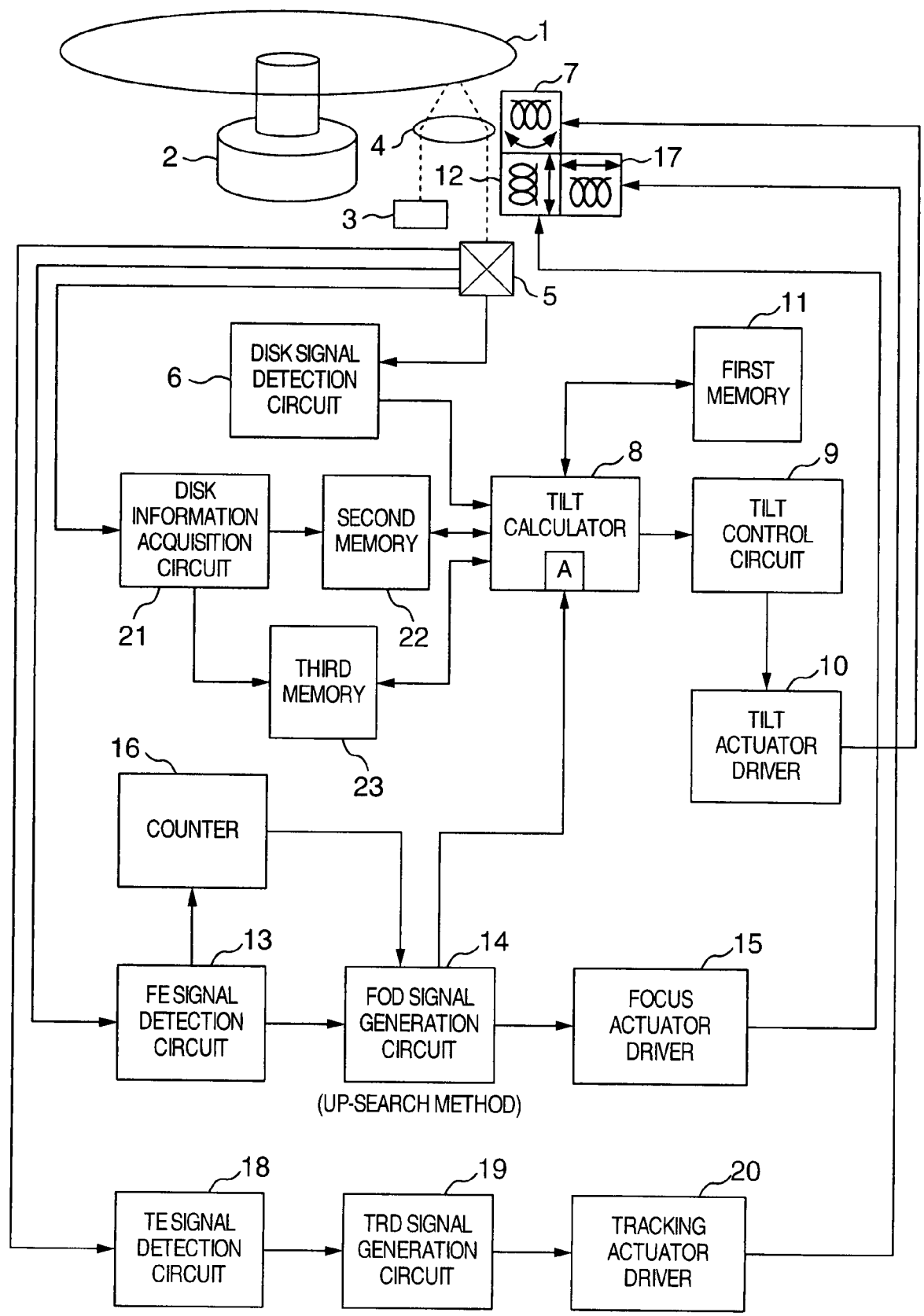
FIG. 7 is a block diagram showing a configuration example of the optical disk device according to a fifth embodiment of the present invention.

FIG. 7 is a block diagram showing a configuration example of the optical disk device according to a fifth embodiment of the present invention. Hereinafter, explanation will be given on the operation of each block with reference to FIG. 7

In the optical disk shown in FIG. 7, the blocks indicated by reference symbols 1-7, 9-11, and A operate in the same way as the corresponding blocks in FIG. 3; the blocks indicated by reference symbols 12, 13, and 15 operate in the same way as the corresponding blocks in FIG. 5; and the blocks indicated by reference symbols 8, and 17-23 operate in the same as the corresponding blocks in FIG. 6. Accordingly, their explanations are omitted. It should be noted that the first memory 11 here is equivalent to the memory 11 in the respective embodiments.

The optical disk according to the fifth embodiment of the invention shown in FIG. 7 is characterized by the up-search method like the aforementioned embodiment. When the count value of counter circuit 16 has reached a predetermined value while the up-search method is executed, the focus pull in process and track pull in process are performed, after which the tilt adjustment A is executed and the optimal tilt correction value stored in the first memory 11 is set in the tilt control circuit 9 according to the disk address information stored in the second memory 22 or the disk layer information stored in the third memory 23.

Subsequently, detailed explanation will be given on the tilt adjustment executed in the optical disk device of the present invention whose configuration has been explained above, with reference to a flowchart.

Figure 8:
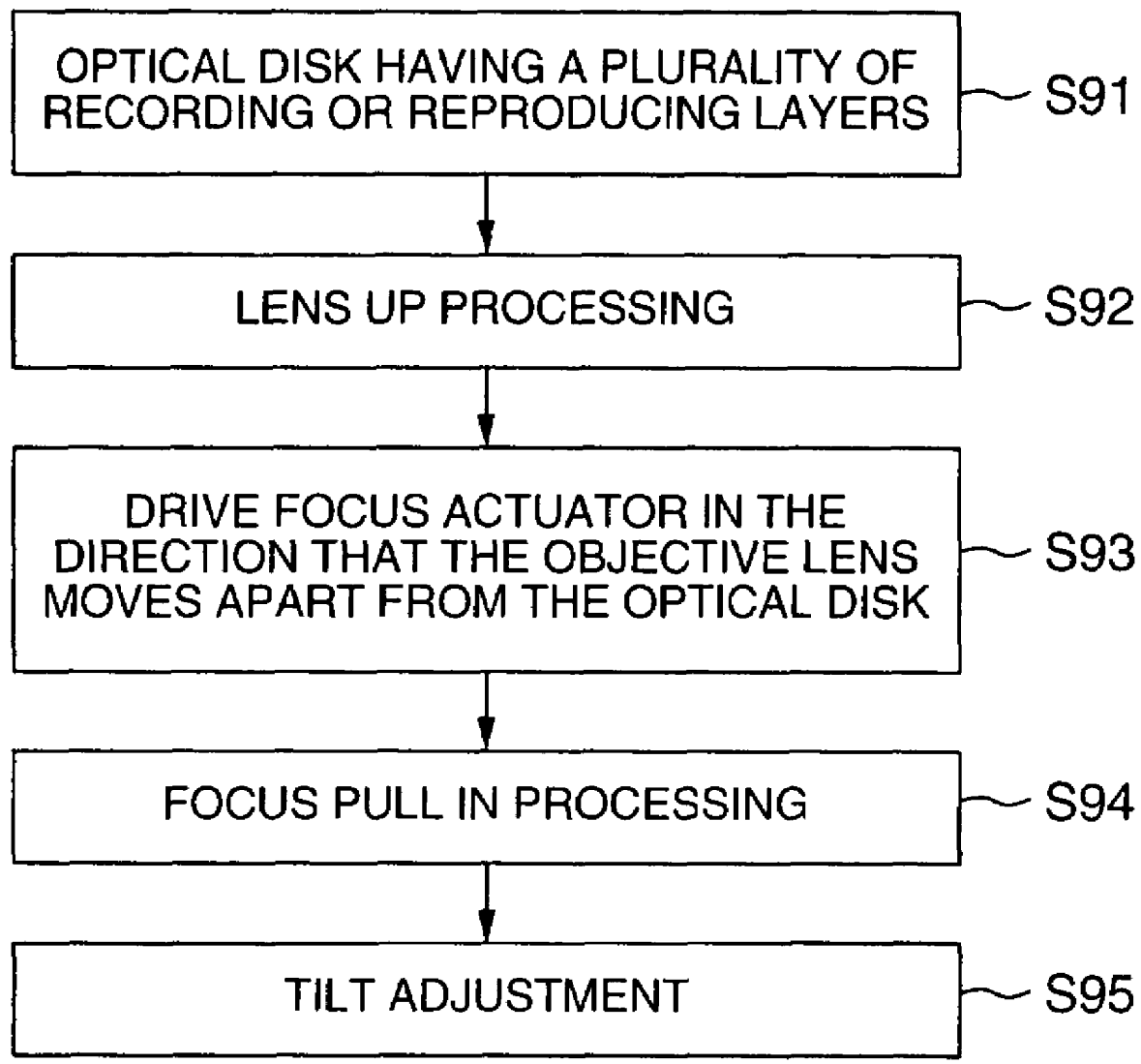
FIG. 8 is a flowchart showing an operation performed before carrying out the tilt adjustment method in the optical disk device of the present invention, especially in the down search method.

Firstly, FIG. 8 shows a flowchart in which the optical disk device is characterized by the down-search method. For this, the tilt adjustment method is executed to the recording/reproducing layer which has executed the focus pull in process firstly.

Hereinafter, explanation will be given on the process of each step of FIG. 8.

Firstly, in step S91, it is confirmed that an optical disk 1 having a plurality of recording/reproducing layers is mounted on the optical disk device. Next, in step S92, a lens up process is performed so as to set the objective lens 4 at a predetermined position. After this, in step S93, the focus actuator 7 is driven to move the objective lens 4 apart from the optical disk 1. In step S94, the focus pull in process is performed. After this, in step S95, the aforementioned tilt adjustment is executed.

Figure 9:
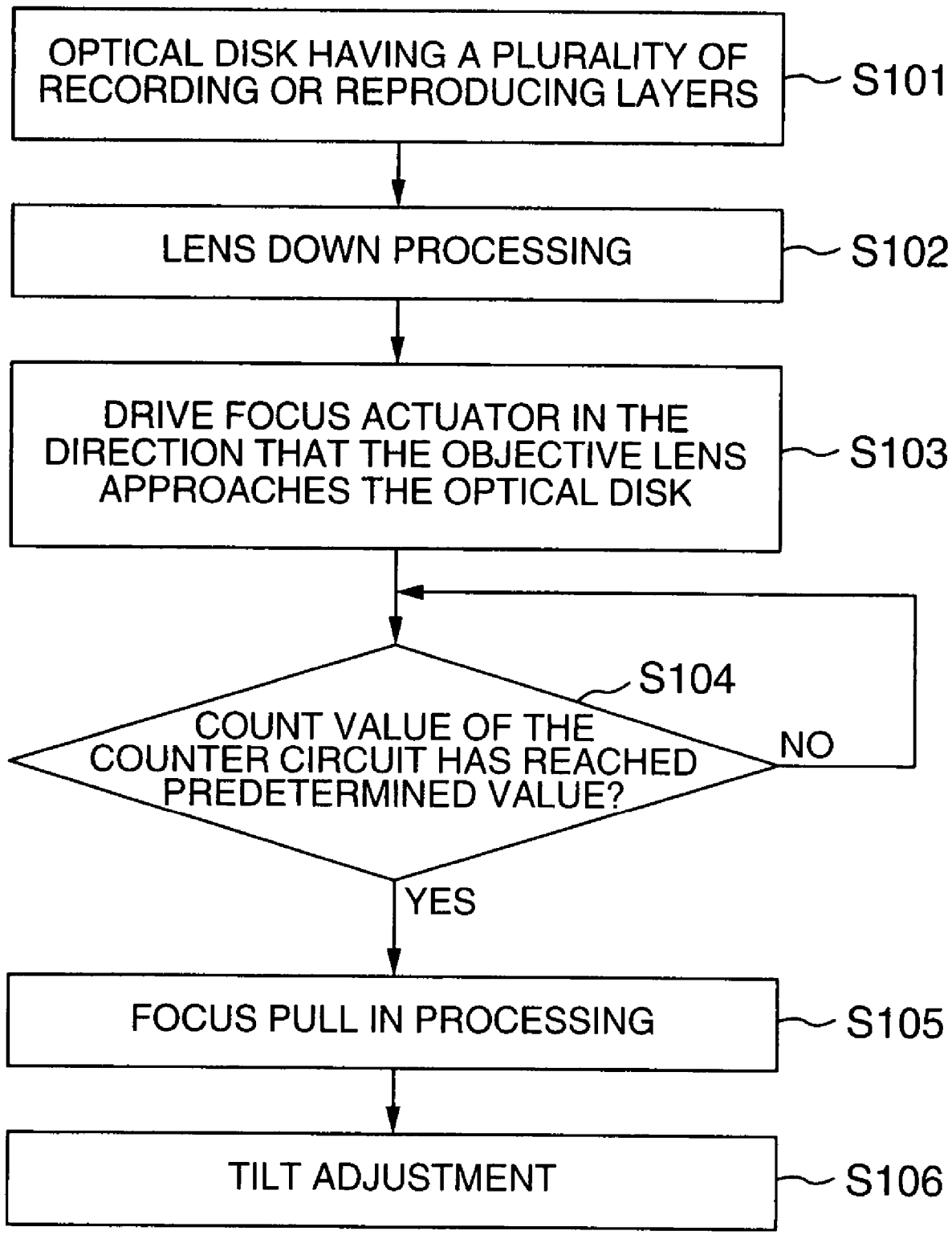
FIG. 9 is a flowchart showing an operation performed before carrying out the tilt adjustment method in the optical disk device of the present invention, especially in the up-search method.

Next, FIG. 9 shows a flowchart in which the optical disk device is characterized by the up-search method, and when the count value of the counter circuit (for example, the counter circuit 16 of FIG. 5) has reached a predetermined value, the focus pull in process is executed and the tilt adjustment is executed. Hereinafter, explanation will be given on the process of each step of FIG. 9.

Firstly, in step S101, it is confirmed that an optical disk having a plurality of recording/reproducing layers is mounted on the optical disk device. After this, in step S102, the lens down process is executed so as to set the objective lens at a predetermined position. In step S103, the focus actuator is driven so that the objective lens approaches the optical disk. In step S104, the count value of the counter circuit is counted until it has reached a predetermined value. When the value has reached the predetermined value, the focus pull in process is executed in step S105. After this, in step S106, the tilt adjustment is executed.

Figure 10:
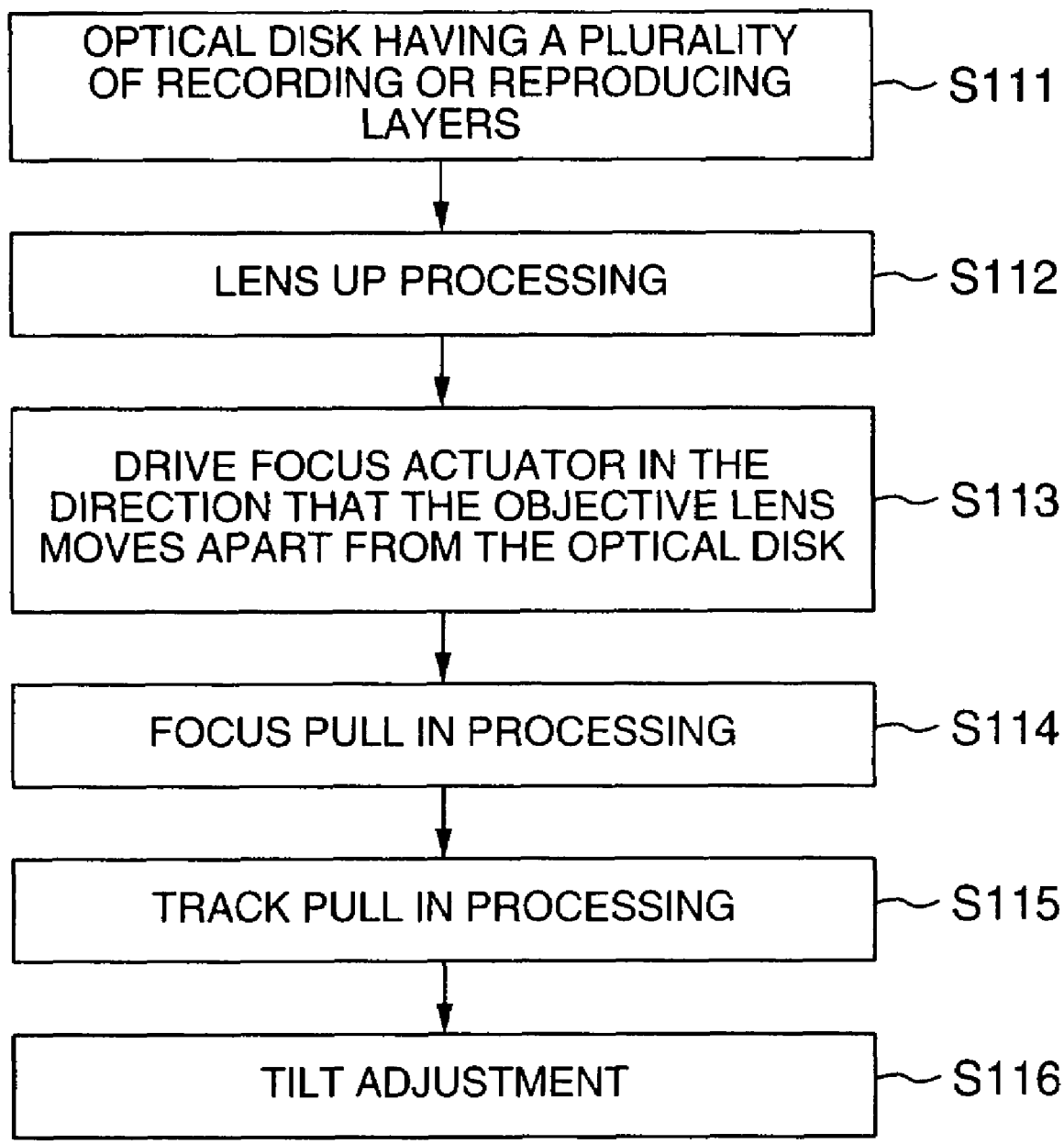
FIG. 10 is a flowchart showing another operation performed before carrying out the tilt adjustment method in the optical disk device of the present invention, especially in the down-search method.

Next, FIG. 10 shows a flowchart in which the optical disk device is characterized by the down-search method. The track pull in process is executed in the recording/reproducing layer which has executed the focus pull in process firstly and then the tilt adjustment is executed. Hereinafter, explanation will be given on the process of each step of FIG. 10.

Firstly, in step S111, it is confirmed that an optical disk having a plurality of recording/reproducing layers is mounted on the optical disk device. In step S112, the lens up process is executed so as to set the objective lens at a predetermined position. In step S113, the focus actuator is driven so that the objective lens moves apart from the optical lens. In step S114, the focus pull in process is executed. Furthermore, in step S115, the track pull in process is executed. After this, in step S116, the tilt adjustment is executed.

Figure 11:
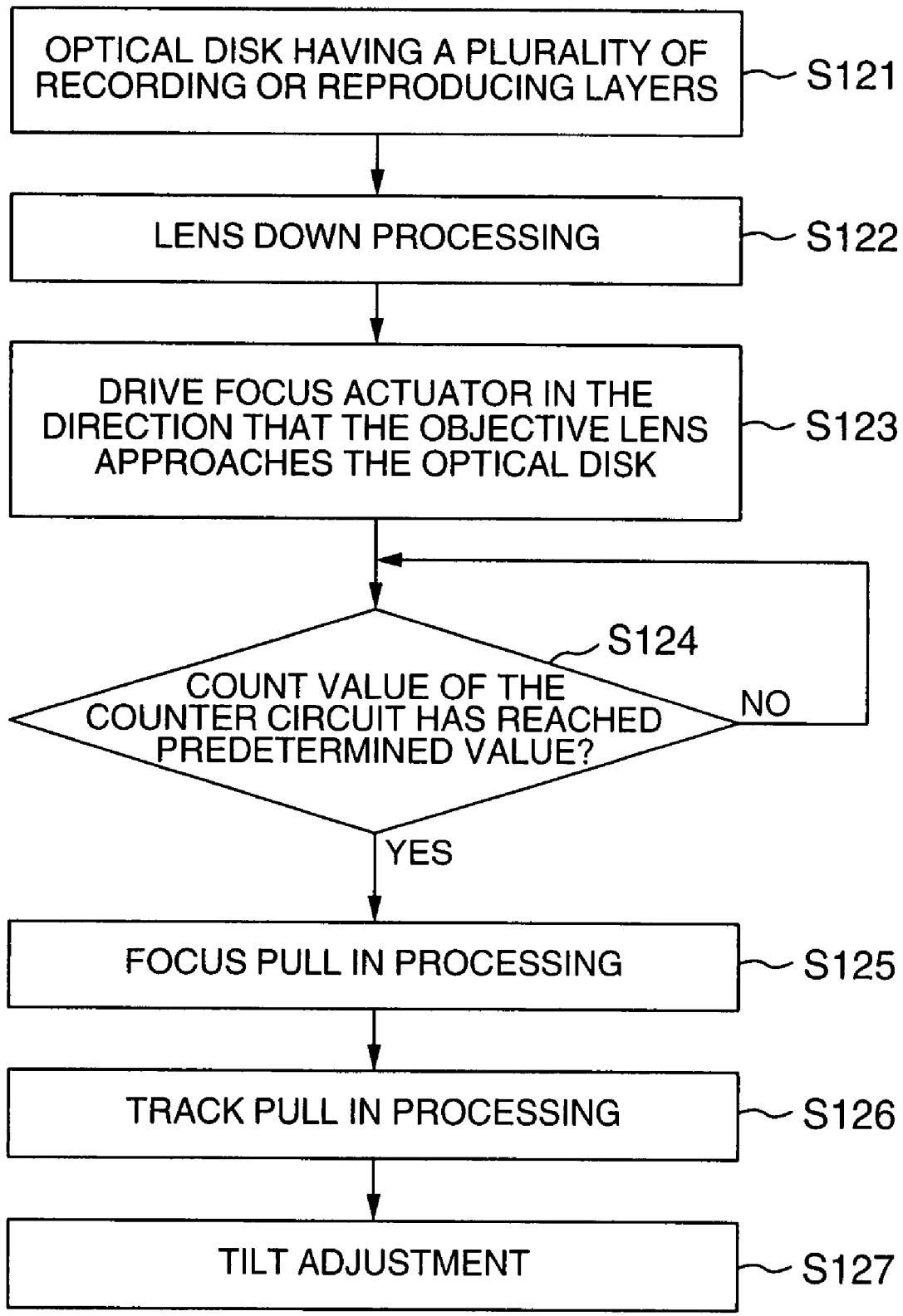
FIG. 11 is a flowchart showing another operation performed before carrying out the tilt adjustment method in the optical disk device of the present invention, especially in the up-search method.
Figure 12:
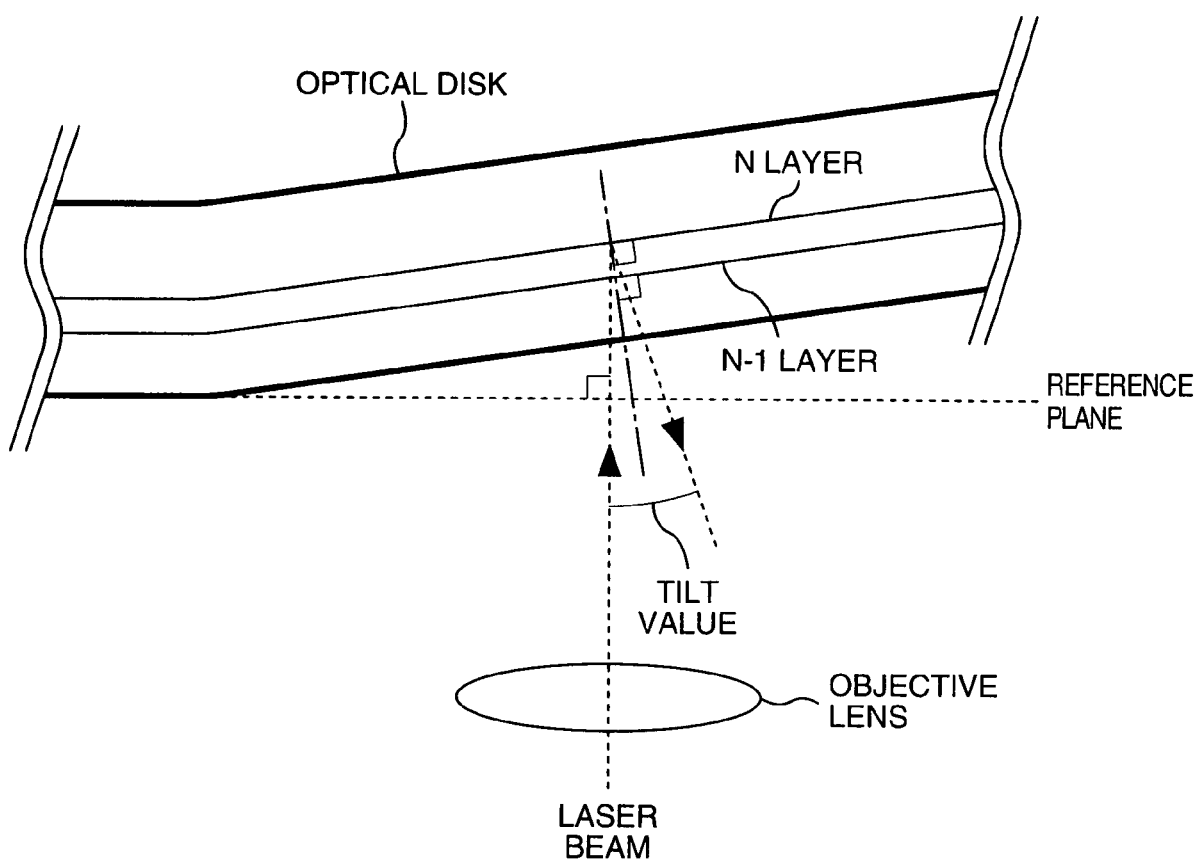
FIG. 12 is a diagram explaining a tilt value of an optical disk having a plurality of recording/reproducing layers according to the present invention.
Figure 13A:
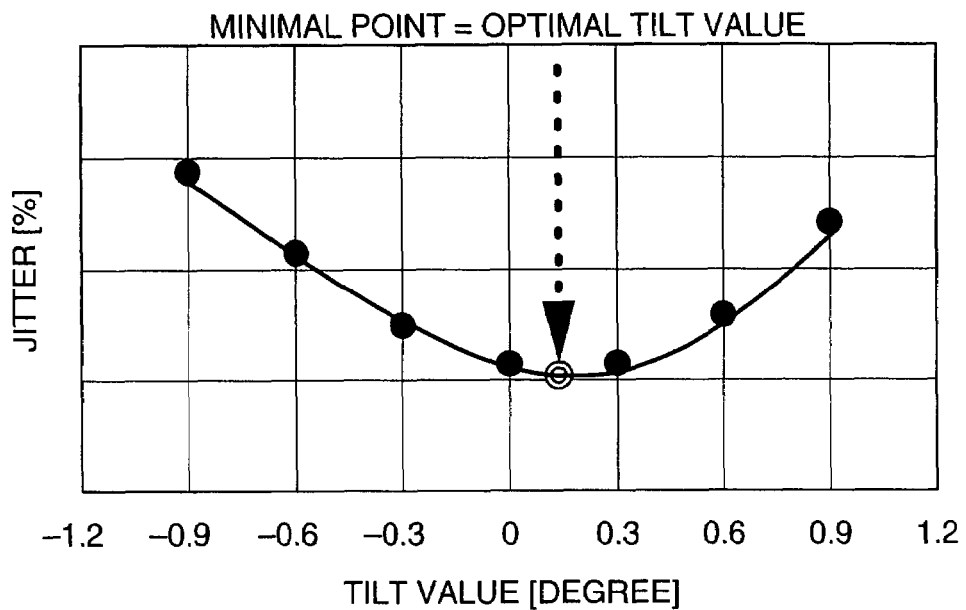
FIG. 13A and FIG. 13B explain the relationship between the aforementioned tilt value and the jitter obtained.
Figure 13B:
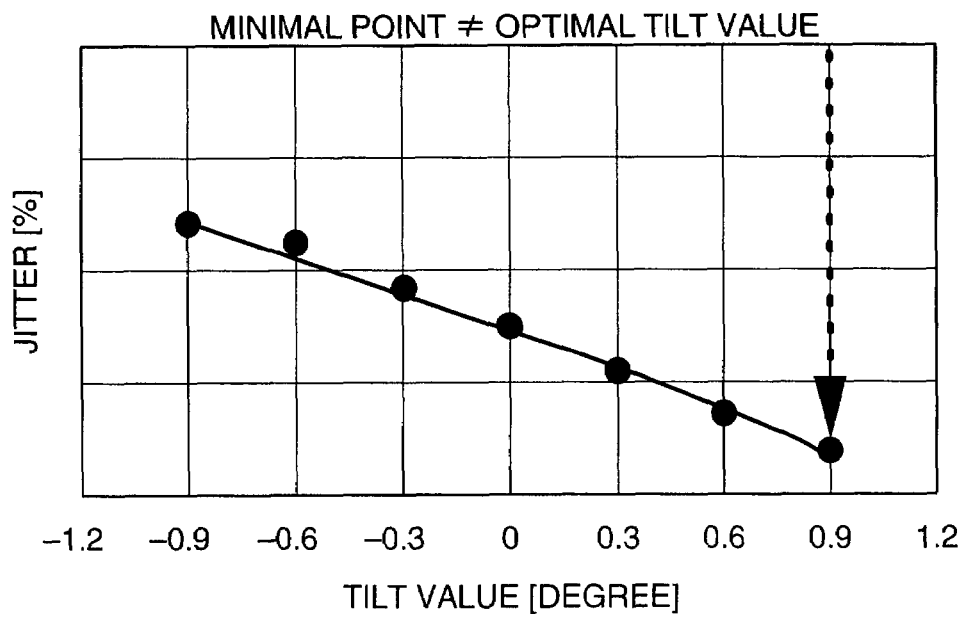
Figure 14A:
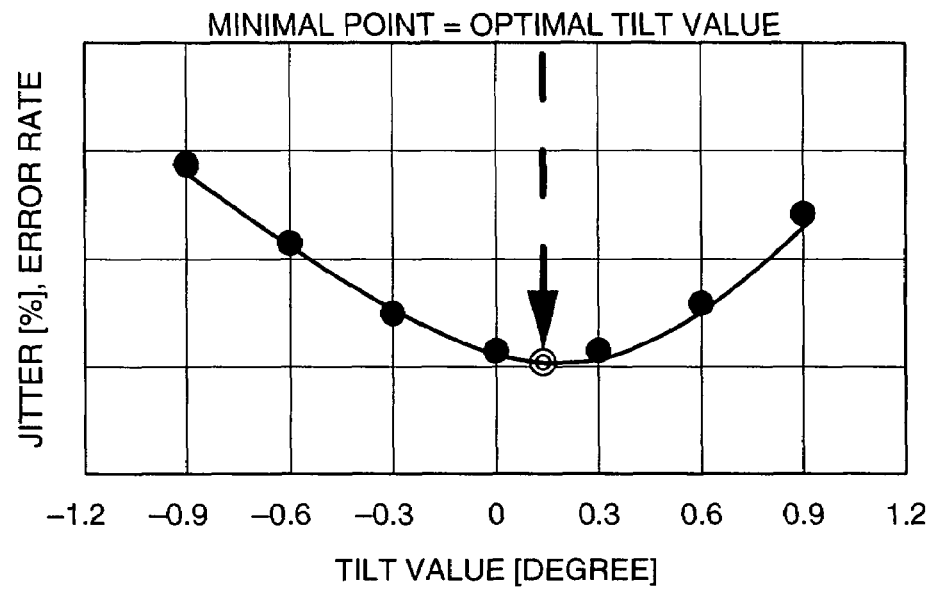
FIG. 14A shows the result of tilt adjustment performed with the jitter related to tilt or the error rate related to tilt.
Figure 14B:
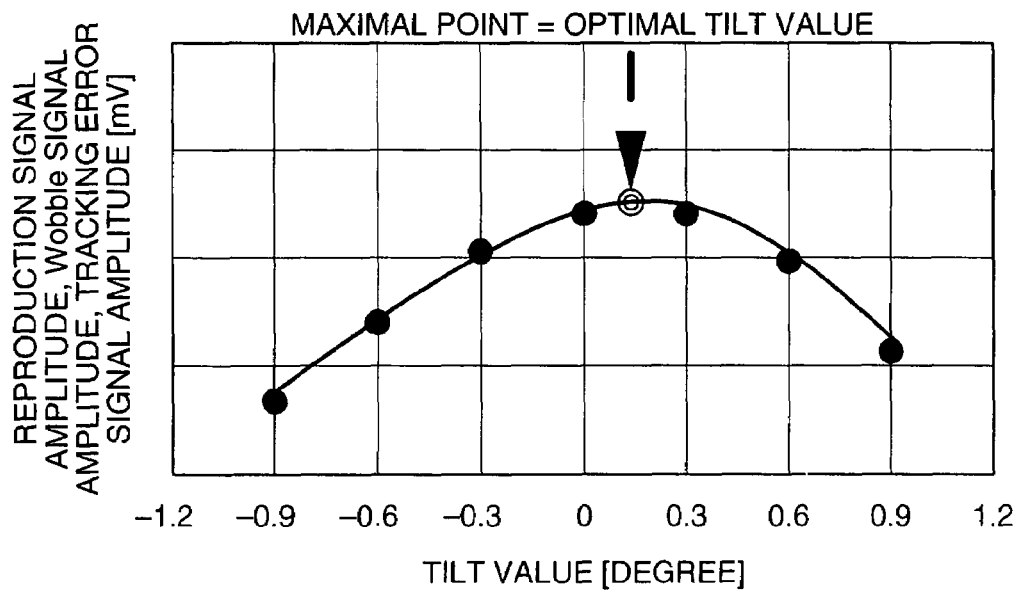
FIG. 14B shows the result of tilt adjustment performed with RF signal amplitude related to tilt or wobble signal amplitude related to tilt or tracking error signal amplitude related to tilt.

Furthermore, FIG. 11 shows a flowchart in which the optical disk device is characterized by the up-search method. When the counter value of the counter circuit has reached a predetermined value while the up-search method is executed, the focus pull in process and the track pull in process are executed, after which the tilt adjustment is executed. Hereinafter, explanation will be given on the process of each step of FIG. 11.

Firstly, in step S121, it is confirmed that an optical disk having a plurality of recording/reproducing layers is mounted on the optical disk device. In step S122, the lens down process is executed so as to set the objective lens at a predetermined position. In step S123, the focus actuator is driven so that the objective lens approaches the optical disk. In step S124, the count value of the counter is counted until it reaches a predetermined value. When the value has reached the predetermined value, the focus pull in process is executed in step 125. Furthermore, in step S126, the track pull in process is executed. After this, in step S127, the tilt adjustment is executed. It should be noted that when the time until start of recording or reproduction onto/from the optical disk device is limited, by appropriately setting the count value of the counter circuit where the time until the tilt adjustment is executed is set, according to the time limit, it is possible to cope with the case.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A tilt control method in an optical disk device for irradiating a laser beam onto a layer of an optical disk having a plurality of recording/reproducing layers for recording information or reproducing information, said optical disk device comprising an objective lens to focus said laser beam onto an information recording surface of said optical disk, a tilt actuator for tilting said objective lens, and a tilt controller which controls said tilt actuator, said method comprising:

correcting a tilt value as an inclination of said optical disk relative to an optical axis of said laser beam, wherein different tilt values are set within a predetermined range at a predetermined radius position of a certain recording/reproducing layer so that a corrected tilt correction value is obtained according to a calculation value of a predetermined signal obtained from a reflected light from said certain recording/reproducing layer in each of the tilt values, wherein the corrected tilt correction value obtained from said certain recording/reproducing layer is applied to the other recording/reproducing layers other than said certain recording/reproducing, as well as being applied to said certain recording/reproducing layer.

2. A tilt control method as claimed in claim 1, wherein the calculation value of the predetermined signal obtained from the optical disk by stepwise setting the tilt value in the predetermined range is a jitter, an error rate, a reproduction signal amplitude, a wobble signal amplitude, or a tracking error signal amplitude.

3. A tilt control method as claimed in claim 2, wherein the jitter or the error rate obtained from the optical disk by stepwise setting the tilt value in the predetermined range is subjected to a least squares computation to obtain a quadratic function, and the corrected tilt correction value is obtained from a minimum value of the quadratic function.

4. A tilt control method as claimed in claim 2, wherein the reproduction signal amplitude, a wobble signal amplitude, or a tracking error signal amplitude obtained from the optical disk by stepwise setting the tilt value in the predetermined range is subjected to a least squares computation to obtain a quadratic function, and the corrected tilt correction value is obtained from a maximum value of the quadratic function.

5. A tilt control method as claimed in claim 1, wherein no tilt correction value is obtained from the other recording/reproduction layers other than said certain recording/reproducing layer.

6. A tilt control method as claimed in claim 1, wherein said certain recording/reproducing layer from which said corrected tilt correction value is obtained is a layer at the farthest distance from the laser beam irradiation side.

* * * * *

UNITED STATES PATENT AND TRADEMARK OFFICE
CERTIFICATE OF CORRECTION

PATENT NO. : 7,643,392 B2  Page 1 of 1
APPLICATION NO. : 11/974336
DATED : January 5, 2010
INVENTOR(S) : Iijima et al.

It is certified that error appears in the above-identified patent and that said Letters Patent is hereby corrected as shown below:

Title Page:

In the bibliographic data at (*) Notice,

"Subject to any disclaimer, the term of this patent is extended or adjusted under 35 U.S.C. 154(b) by 24 days."

should read,

--Subject to any disclaimer, the term of this patent is extended or adjusted under 35 U.S.C. 154(b) by 24 days.

This patent is subject to a terminal disclaimer.--

Signed and Sealed this

Seventeenth Day of August, 2010

David J. Kappos
*Director of the United States Patent and Trademark Office*